(12) United States Patent
Kmita et al.

(10) Patent No.: US 11,433,309 B2
(45) Date of Patent: Sep. 6, 2022

(54) BEHAVIOURAL PROMOTION IN VIDEO GAMES

(71) Applicant: SQUARE ENIX LTD., London (GB)

(72) Inventors: Bartosz Kmita, Warsaw (PL); Piotr Nowakowski, Warsaw (PL)

(73) Assignee: SQUARE ENIX LTD., London (GB)

(*) Notice: Subject to any disclaimer, the term of this patent is extended or adjusted under 35 U.S.C. 154(b) by 38 days.

(21) Appl. No.: 17/057,535

(22) PCT Filed: Jan. 27, 2020

(86) PCT No.: PCT/GB2020/050175
§ 371 (c)(1),
(2) Date: Nov. 20, 2020

(87) PCT Pub. No.: WO2021/152277
PCT Pub. Date: Aug. 5, 2021

(65) Prior Publication Data
US 2022/0047950 A1  Feb. 17, 2022

(51) Int. Cl.
*A63F 13/58* (2014.01)

(52) U.S. Cl.
CPC .................................. *A63F 13/58* (2014.09)

(58) Field of Classification Search
CPC ....................................................... A63F 13/58
See application file for complete search history.

(56) References Cited

U.S. PATENT DOCUMENTS

2005/0245303 A1* 11/2005 Graepel ................. A63F 13/10
463/1
2007/0087798 A1* 4/2007 McGucken ............ A63F 13/58
463/1

(Continued)

FOREIGN PATENT DOCUMENTS

JP        2003199970 A        7/2003

OTHER PUBLICATIONS

PCT International Search Report and Written Opinion, PCT Application No. PCT/GB2020/050175, dated Oct. 1, 2020, 12 pages.

*Primary Examiner* — Jay Trent Liddle
(74) *Attorney, Agent, or Firm* — Fenwick & West LLP

(57) ABSTRACT

A computer-readable recording medium including a program which is executed by a computer apparatus to provide a video game that is progressed by controlling a character operated by a player in a virtual game world, the program causing the computer apparatus to function as: a character generating unit that generates the character operated by the player, wherein the character is of one of a plurality of character classes in the game world, each character class having at least one associated behavioural trait; a character behaviour monitoring unit that evaluates a player-controlled behavioural characteristic of the character and determines whether the evaluated behavioural characteristic satisfies a respective predetermined condition, the predetermined condition being respective to the behavioural trait associated with the class of the character; and an award generating unit that generates at least one of: a positive indicator or reward if the evaluated behavioural characteristic satisfies the respective predetermined condition, or a negative indicator or punishment if the evaluated behavioural characteristic does not satisfy the respective predetermined condition.

16 Claims, 13 Drawing Sheets

(56) References Cited

U.S. PATENT DOCUMENTS

| | | | |
|---|---|---|---|
| 2007/0219001 A1* | 9/2007 | Mueller | A63F 13/822 463/43 |
| 2011/0256937 A1* | 10/2011 | Van Luchene | A63F 13/69 463/42 |
| 2011/0263322 A1* | 10/2011 | Van Luchene | A63F 13/795 463/29 |
| 2014/0342808 A1 | 11/2014 | Chowdhary et al. | |
| 2015/0336004 A1 | 11/2015 | Shimizu et al. | |

\* cited by examiner

| Behavioural trait lookup table |||
|---|---|---|
| Character class (CC) | Behavioural trait (BT) | Predetermined condition |
| CC1 (sniper) | BT1 (relatively long distance of engagement) | $d > d_{CC1}$ |
| | BT2 (use of a sniper rifle) | Weapon = sniper rifle |
| CC2 (up-close fighter) | BT3 (relatively short distance of engagement) | $d < d_{CC2}$ |
| | BT4 (use of a melee weapon) | Weapon = melee weapon |
| CC3 (wizard) | BT5 (use of magic) | Weapon = magic |
| CC4 (pyromancer) | BT6 (use of fire magic) | Weapon = fire magic |
| | BT7 (relatively long distance of engagement) | $d > d_{CC4}$ |
| CC5 (devastator) | BT8 (infliction of death and destruction) | $n_{death} > n_{deathCC5}$ OR $n_{destruction} > n_{destructionCC5}$ |

*FIG. 8*

| Threshold lookup table |||||
|---|---|---|---|---|
| Character class (CC) | Experience points | Time played (hrs) | Positive threshold | Negative threshold |
| CC1 (sniper) | 10 | 1 | 5 | -28 |
| | 20 | 2 | 10 | -14 |
| | 30 | 3 | 20 | -7 |
| CC2 (up-close fighter) | 10 | 1 | 8 | -25 |
| | 20 | 2 | 12 | -20 |
| | 30 | 3 | 16 | -15 |

*FIG. 9*

| Behaviour monitoring (indicator count) table | | |
|---|---|---|
| Indicator count | Positive threshold | Negative threshold |
| 5 | 10 | -14 |

*FIG. 10*

| Reward/punishment lookup table | | |
|---|---|---|
| Character class (CC) | Reward | Punishment |
| CC1 (sniper) | Issuance of more experience points | Character not receiving healing |
| CC2 (up-close fighter) | Increase in character's health | Character not receiving healing |

*FIG. 11*

| First and second value lookup table | | |
|---|---|---|
| Character class (CC) | First value | Second value |
| CC1 (sniper) | 2 | 4 |
| CC2 (up-close fighter) | 1 | 1.5 |

*FIG. 12*

BEHAVIOURAL PROMOTION IN VIDEO GAMES

FIELD OF THE INVENTION

The present invention relates to video games, and more particularly to a mechanism for promoting desirable characteristics, and/or for discouraging undesirable characteristics, in respect of player character behaviour within a video game.

BACKGROUND TO THE INVENTION

In many multiplayer video games (for example, but not limited to, network-based massively multiplayer online games, or role-playing games), and also some single player games (e.g. played on a standalone console), a user may be provided with a selection of different character classes from which they can choose their player character (i.e. the character within the game that is controlled by that particular user). Alternatively the game may assign a character class to a user for their player character, e.g. at random, or based on the user's past history within the game. Examples of such character classes include a sniper, a close-combat fighter, a wizard, a pyromancer, or a healing character. Other examples are mentioned below, and yet further examples will be well known to those skilled in the art.

It should be noted that the term "user" as used herein may be used interchangeably with the term "player", and the two terms should be treated as synonymous.

Each of the different character classes within a game usually has a distinctive respective appearance, and the game may be designed such that each of the different character classes has at least one associated behavioural trait that may be considered to represent a desirable characteristic of that particular character class. For example, to act in a manner that is befitting to the character class, it is desirable that a sniper should engage in gun-based combat with an enemy character from a relatively long distance, whereas it is desirable that a close-combat fighter should fight an enemy character using a melee weapon at a relatively close distance.

However, it can be confusing to game players as to what particular behavioural traits or playing styles represent a desired characteristic of each player's respective character class, and indeed which behavioural traits or playing styles are undesirable for that particular character class. Indeed, players, particularly in multiplayer/multicharacter games, can get confused as to what is expected of them, e.g. as a consequence of there being too much choice and flexibility in respect of how they can control their character and cause it to behave.

As a consequence, the resulting gameplay can become muddled, with the characters behaving in a somewhat haphazard manner, rather than acting in accordance with their respective character type. In turn, this can lead to the gameplay not being as enjoyable, satisfying or successful as would be desired.

Moreover, in some games it can be desirable for the different character types to collaborate or to otherwise carry out specific roles in a coordinated manner, in order to advance the game in a smooth way, potentially towards a common goal of the characters. However, if the player characters are left to behave in a haphazard manner, this is likely to result in a lack of collaboration between the characters, making it harder to achieve a common goal.

Accordingly, there is a desire to encourage a player to control their character in a manner that is befitting to that character's respective character class, and to discourage the player from controlling their character in a manner that is contrary to the respective character class, in order to result in overall gameplay that is more coordinated and balanced between the different characters, and thus more satisfying and enjoyable for the players.

SUMMARY OF THE INVENTION

According to a first aspect of the invention there is provided a computer-readable recording medium including a program which is executed by a computer apparatus to provide a video game that is progressed by controlling a character operated by a player in a virtual game world, the program causing the computer apparatus to function as: a character generating unit that generates the character operated by the player, wherein the character is of one of a plurality of character classes in the game world, each character class having at least one associated behavioural trait; a character behaviour monitoring unit that evaluates a player-controlled behavioural characteristic of the character and determines whether the evaluated behavioural characteristic satisfies a respective predetermined condition, the predetermined condition being respective to the behavioural trait associated with the class of the character; and an award generating unit that generates at least one of: a positive indicator or reward if the evaluated behavioural characteristic satisfies the respective predetermined condition, or a negative indicator or punishment if the evaluated behavioural characteristic does not satisfy the respective predetermined condition.

By virtue of the operation of the character behaviour monitoring unit and award generating unit, this advantageously encourages and incentivises a player to control their video game character in a manner which is in accordance with the respective character class, which can result in more satisfying and enjoyable gameplay. In multiplayer games this may also result in a better mix of gameplay styles, and more coordinated and balanced character behaviour, in which the different characters are more likely to fulfil their respective roles.

Preferably, the virtual game world is three-dimensional (generated for instance using animated video rendering, e.g. photorealistic video rendering in particular).

Optionally, the plurality of character classes and the predetermined conditions respective to the associated behavioural traits of the character classes are stored in a lookup table or database.

In certain embodiments, the award generating unit may be configured to issue a reward to the player when a positive indicator is generated.

In certain embodiments, the award generating unit may be configured to issue a punishment to the player when a negative indicator is generated.

In certain embodiments, the award generating unit may be configured to maintain an indicator count, to increase the value of the indicator count when a positive indicator is generated, and to issue a reward to the player when the value of the indicator count is equal to a positive threshold value.

Optionally, the award generating unit may be further configured to decrease the value of the indicator count when a negative indicator is generated.

Further, the award generating unit may be configured to issue a punishment to the player when the value of the indicator count is equal to a negative threshold value.

When a positive indicator is generated, the award generating unit may be configured to increase the value of the indicator count by a first value, and when a negative indicator is generated, the award generating unit may be configured to decrease the value of the indicator count by a second value.

The first and second values may be stored in a lookup table or database. Optionally, the first and second values may be specific to the character operated by the player. Alternatively, the first and second values may be specific to the character class.

Optionally, the first value may be different from the second value. Thus, the value by which a positive indicator progresses towards a positive threshold value may be different from the counteracting value by which a negative indicator progresses towards a negative threshold value.

The positive threshold value may be stored in a lookup table or database. Optionally, the positive threshold value may be specific to the character operated by the player. Alternatively, the positive threshold value may be specific to the character class.

Likewise, the negative threshold value may be stored in a lookup table or database (potentially the same lookup table or database as that in which the positive threshold value is stored). Optionally, the negative threshold value may be specific to the character operated by the player. Alternatively, the negative threshold value may be specific to the character class.

In certain embodiments, the program may cause the positive threshold value and/or the negative threshold value to change as a function of the time the player has been playing the game. Alternatively, the program may cause the positive threshold value and/or the negative threshold value to change as a function of experience points accumulated by the character in the game.

In certain embodiments, the issued reward may comprise at least one of: an increase in the character's health, or the issuance of one or more experience points.

In embodiments in which a punishment may be awarded, the punishment may comprise the character not receiving healing.

In certain embodiments, the character classes may comprise one or more of: sniper, pyromancer, close-combat fighter, or devastator. Other possible character classes will be readily apparent to those skilled in the art.

By way of a first example, a behavioural trait associated with the class of sniper may be the use of a sniper rifle, and the respective predetermined condition may be the choice of a sniper rifle as a weapon. A further behavioural trait associated with the class of sniper may be attacking an enemy character from a relatively long distance, and the respective predetermined condition may be the distance between the character operated by the player and the enemy character being greater than a threshold value.

As a second example, a behavioural trait associated with the class of pyromancer may be the use of fire magic, and the respective predetermined condition may be the choice of fire magic as a weapon.

By way of a third example, a behavioural trait associated with the class of close-combat fighter may be the use of a melee weapon (e.g. a sword, club, dagger, axe, spear etc.), and the respective predetermined condition may be the choice of a melee weapon as a weapon. A further behavioural trait associated with the class of close-combat fighter may be attacking an enemy character at a relatively short distance, and the respective predetermined condition may be the distance between the character operated by the player and the enemy character being less than a threshold value.

As a fourth example, a behavioural trait associated with the class of devastator may be the infliction of death and destruction, and the respective predetermined condition may be causing the death of at least a threshold number of other characters, or causing the destruction of at least a threshold number of objects in the game world.

The character behaviour monitoring unit may be configured to evaluate the behavioural characteristic of the character when the character commences combat.

The computer apparatus may be a video game apparatus such as a personal computer or a video game console; or may be a network server hosting the game; or may be a user terminal running a network-based game.

Optionally, the program may allow the player to choose their character from one of the plurality of character classes.

BRIEF DESCRIPTION OF THE DRAWINGS

Embodiments of the invention will now be described, by way of example only, and with reference to the drawings in which:

FIG. 8 is an illustrative example of a behavioural trait lookup table, to which the routines of certain embodiments may refer;

FIG. 9 is an illustrative example of a threshold lookup table, to which the routines of certain embodiments may refer;

FIG. 10 is an illustrative example of a behaviour monitoring (indicator count) table, to which the routines of certain embodiments may refer;

FIG. 11 is an illustrative example of a reward/punishment lookup table, to which the routines of certain embodiments may refer;

FIG. 12 is an illustrative example of a first and second value lookup table, to which the routines of certain embodiments may refer;

DETAILED DESCRIPTION OF PREFERRED EMBODIMENTS

The present embodiments represent the best ways known to the Applicant of putting the invention into practice. However, they are not the only ways in which this can be achieved.

Embodiments of the present invention provide a character behaviour monitoring and reward generating routine that forms part of a video game. The video game is provided as a computer program. The computer program may be supplied on a computer-readable medium (e.g. a non-transitory computer-readable recording medium such as a CD or DVD) having computer-readable instructions thereon. Alternatively the computer program may be provided in a downloadable format, over a network such as the Internet, or may be hosted on a server.

Figure 1:
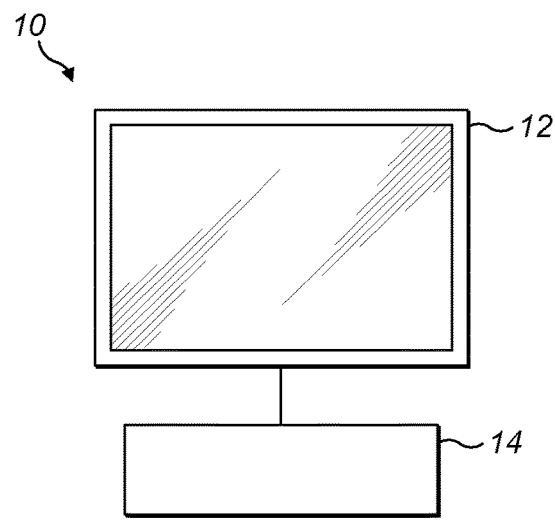
FIG. 1 schematically illustrates a video game apparatus (for example a personal computer or a video game console) on which a video game which incorporates an embodiment of the present invention may be played.

With reference to FIG. 1, the video game program may be executed on a video game apparatus 10, such as a personal computer or a video game console. The video game apparatus 10 comprises a display screen 12 on which the video game is displayed, and a control unit 14 which typically includes at least a Central Processing Unit (CPU), a Read Only Memory (ROM) and a Random Access Memory (RAM). The control unit 14 may also include a Graphics Processing Unit (GPU) and a sound processing unit. The display screen 12 and the control unit 14 may be provided in a common housing, or may be separate connected units. The video game apparatus 10 also includes one or more user input devices by which the user can control a player character in the game. Such a user input device may comprise, for example, a mouse, a keyboard, a hand-held controller (e.g. incorporating a joystick and/or various control buttons), or a touchscreen interface integral with the display screen 12 (e.g. as in the case of a smartphone or a tablet computer). The video game apparatus 10 may be connected to a network such as the Internet, or may be stand-alone apparatus that is not connected to a network.

Figure 2:
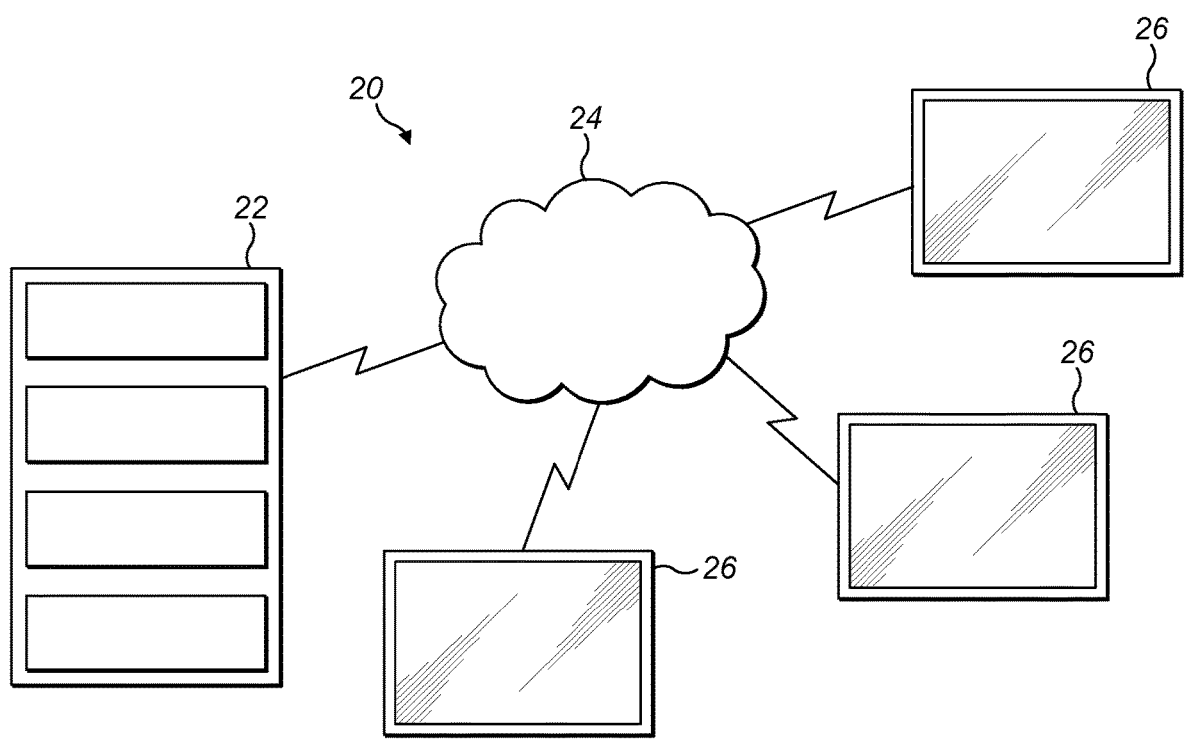
FIG. 2 schematically illustrates a network-based video game system comprising a server and a plurality of client terminals, on which terminals a video game which incorporates an embodiment of the present invention may be played.

Alternatively, with reference to FIG. 2, the video game program may be executed within a network-based video game system 20. The video game system 20 comprises a server device 22, a communication network 24 (e.g. the Internet), and a plurality of user terminals 26 operated by respective users. The server device 22 communicates with the user terminals 26 through the communication network 24. Each user terminal 26 may comprise a network-connectable video game apparatus 10 as described above, such as a personal computer or a video game console, or a smartphone, a tablet computer, or some other suitable piece of user equipment. The video game program may be executed on the server 22, which may stream user-specific game content (e.g. video in real time) to each of the plurality of user terminals 26. At each user terminal the respective user can interact with the game and provide input that is transmitted to the server 22, to control the progress of the game for the user. Alternatively, for a given user, the video game program may be executed within the respective user terminal 26, which may interact with the server 22 when necessary.

In either case, the video game progresses in response to user input, with the user input controlling a player character. The user's display screen may display the player character's field of view in the game world in a "first-person" manner, preferably in three dimensions, and preferably using animated video rendering (e.g. photorealistic video rendering in particular), in the manner of a virtual camera.

Alternatively, the user's display screen may display the player character and other objects or characters in the game world in a "third-person" manner, again preferably in three dimensions, and preferably using animated video rendering (e.g. photorealistic video rendering in particular), in the manner of a virtual camera.

Figure 3:
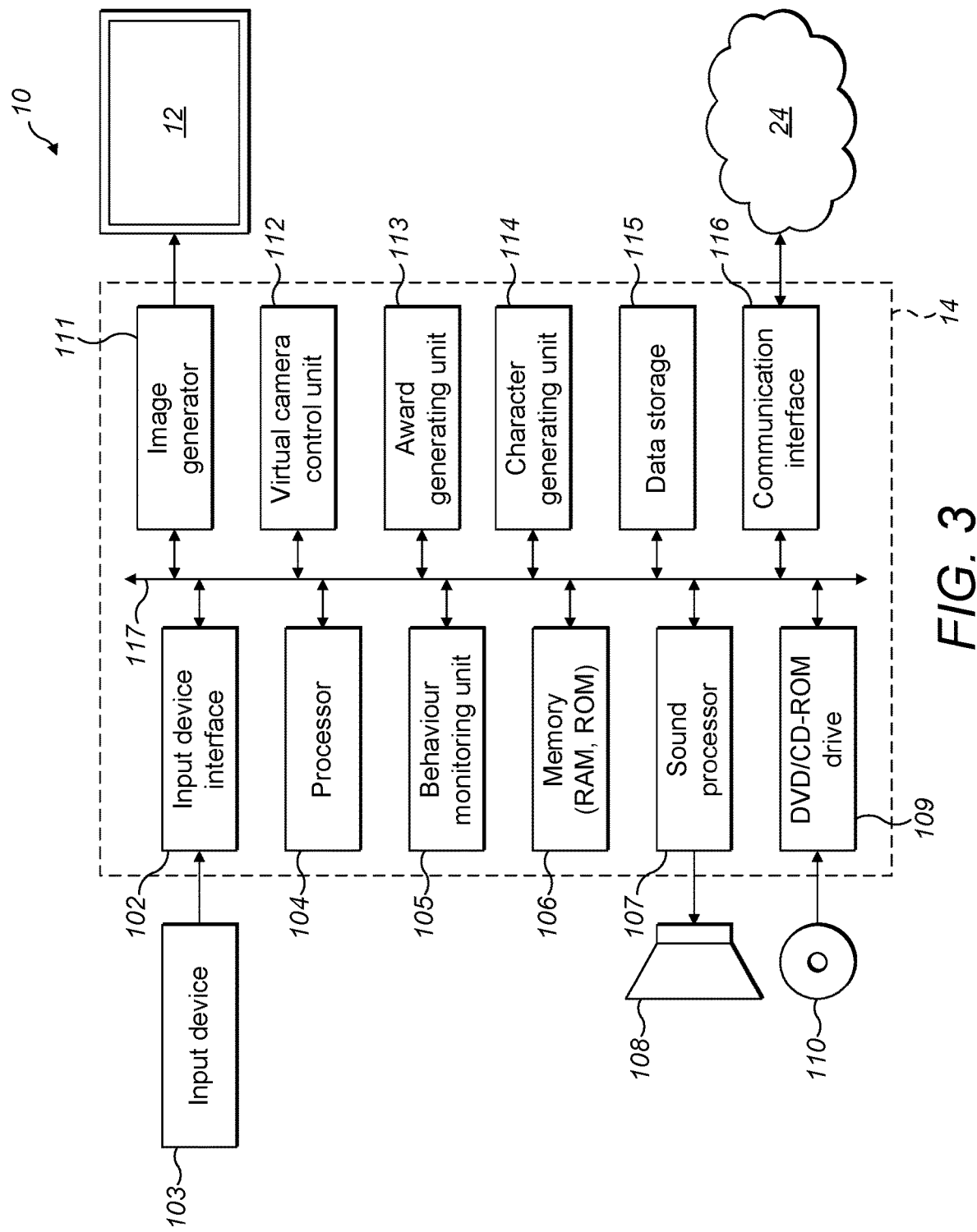
FIG. 3 is a block diagram showing the configuration of a video game apparatus as shown in FIG. 1.

FIG. 3 is a block diagram showing the configuration of the video game apparatus 10 shown in FIG. 1, in the case of the game being executed on such apparatus.

It will be appreciated that the contents of the block diagram are not exhaustive, and that other components may also be present.

As illustrated, the control unit 14 of the video game apparatus 10 includes an input device interface 102 to which an input device 103 (e.g. a mouse, a keyboard or a hand-held controller, e.g. incorporating a joystick and/or various control buttons, as mentioned above) is connected, a processor (e.g. CPU) 104, and an image generator (e.g. GPU) 111 to which a display unit 12 is connected.

The control unit 14 also includes memory (e.g. RAM and ROM) 106, a sound processor 107 connectable to a sound output device 108, a DVD/CD-ROM drive 109 operable to receive and read a DVD or CD-ROM 110 (both being examples of a computer-readable recording medium), a communication interface 116 connectable to the communication network 24 (e.g. the Internet), and data storage means 115 via which data can be stored on a storage device (either within or local to the video game apparatus 10, or in communication with the control unit 14 via the network 24). For a stand-alone (not network connected) video game apparatus, the communication interface 116 may be omitted.

The video game program causes the control unit 14 to take on further functionality of a behaviour monitoring unit 105, a virtual camera control unit 112, an award generating unit 113, and a character generating unit 114.

An internal bus 117 connects components 102, 104, 105, 106, 107, 109, 111, 112, 113, 114, 115 and 116 as shown.

Figure 4:
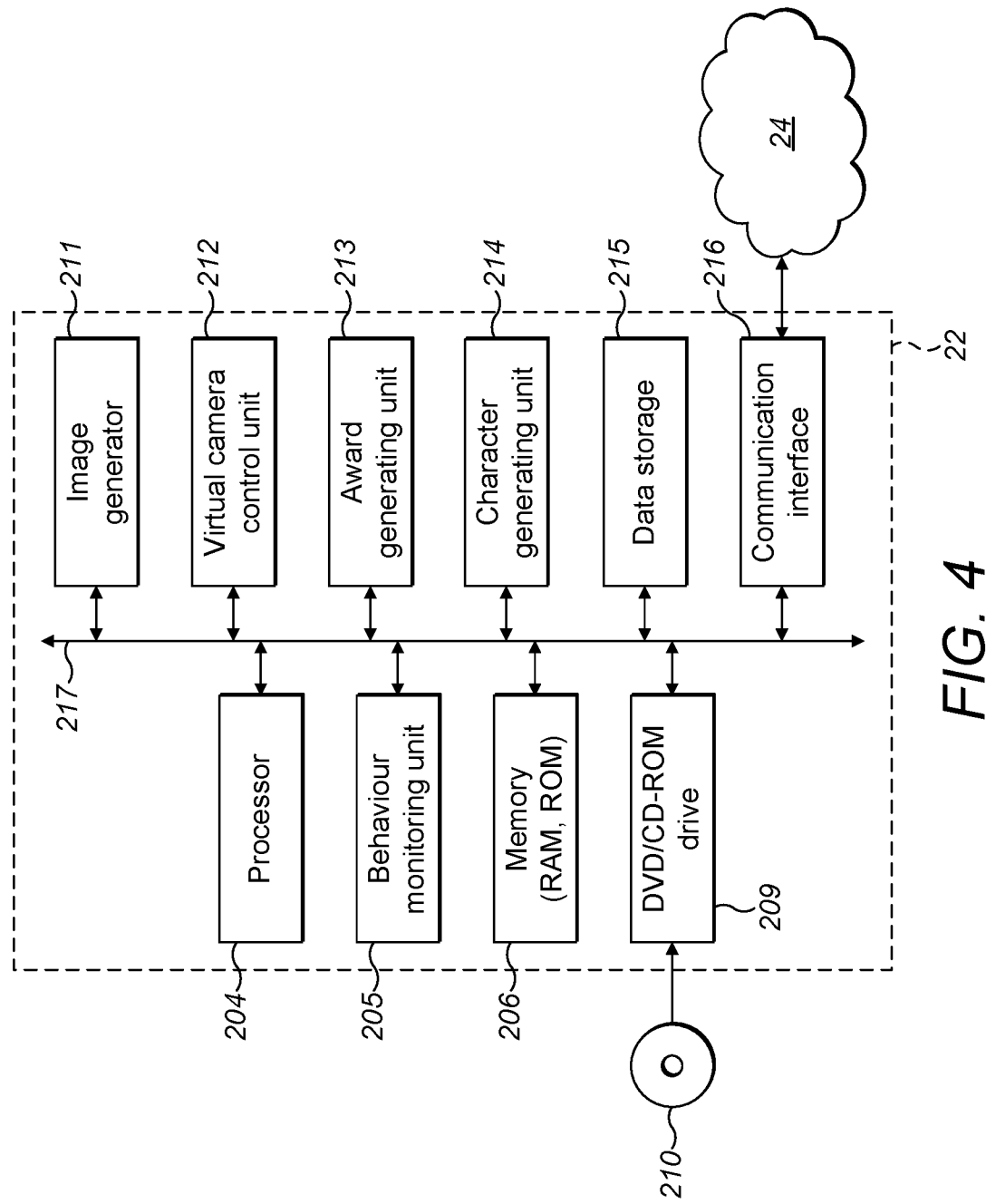
FIG. 4 is a block diagram showing the configuration of a server as shown in FIG. 2.

FIG. 4 is a block diagram showing the configuration of the server apparatus 22 shown in FIG. 2, in the case of the game being executed within a network-based video game system. It will be appreciated that the contents of the block diagram are not exhaustive, and that other components may also be present.

As illustrated, the server apparatus 22 includes a processor (e.g. CPU) 204, and an image generator (e.g. GPU) 211, memory (e.g. RAM and ROM) 206, a DVD/CD-ROM drive 209 operable to receive and read a DVD or CD-ROM 210 (both being examples of a computer-readable recording medium), a communication interface 216 connected to the communication network 24 (e.g. the Internet), and data storage means 215 via which data can be stored on a storage device (either within or local to the server apparatus 22, or in communication with the server apparatus 22 via the network 24).

The video game program causes the server apparatus 22 to take on further functionality of a behaviour monitoring unit 205, a virtual camera control unit 212, an award generating unit 213, and a character generating unit 214.

An internal bus 217 connects components 204, 205, 206, 209, 211, 212, 213, 214, 215 and 216 as shown.

Via the communication interface 216 and the network 24, the server apparatus 22 may communicate with a user terminal 26 (e.g. video game apparatus 10) as mentioned above, during the course of the video game. Amongst other things, the server apparatus 22 may receive user input from the input device 103 of the video game apparatus 10, and may cause video output to be displayed on the display screen 12 of the video game apparatus 10.

Player Character Behaviour Monitoring and Award Generation

In accordance with the present disclosure, to encourage and incentivise a user to control their video game character (player character) in a manner which is in accordance with the respective character class of the player character, the player character is rewarded for the carrying out certain behaviours that are befitting to that character class, and may optionally be punished for carrying out behaviours that are contrary to that character class.

The player character is of one of a plurality of character classes in the game world, with each character class having at least one associated behavioural trait. The player character is generated by the character generating unit 114/214. Examples of different character classes are as follows:

Sniper class (e.g. as depicted by character 303 in FIG. 13)
Close-combat fighter class (e.g. as depicted by character 307 in FIG. 15)
Wizard class (e.g. as depicted by character 309 in FIG. 16)
Pyromancer class (e.g. as depicted by character 311 in FIG. 17)
Devastator class (not illustrated)
Healing class (not illustrated)

As those skilled in the art will appreciate, many other character classes are possible, for example based on fantasy characters, historical characters, battling characters, etc.

In the game, the user may be presented with a list/menu of character classes from which they can select their character. Alternatively, the game may assign a character class to a user for their player character, e.g. at random, or based on the user's past history within the game.

The behaviour monitoring process and the process of issuing a reward (or potentially a punishment) is preferably carried out as a background monitoring routine within the overall game. In the presently-preferred embodiment the behaviour monitoring is initiated when the player character commences combat (e.g. an instance of one-on-one combat, or a battle royal). However, in alternative embodiments the behaviour monitoring may be carried out at other (potentially random) moments during gameplay, or over an extended period of time during a gameplay session. Combat may be defined as inflicting damage on, or receiving damage from, an enemy character.

In a general sense, during the operation of the behaviour monitoring and reward generating routine, the character behaviour monitoring unit 105/205 evaluates a player-controlled behavioural characteristic of the character and determines whether the evaluated behavioural characteristic satisfies a predetermined condition, the predetermined condition being respective to the behavioural trait associated with the class of the character. The award generating unit 113/213 then generates at least one of: a positive indicator or reward if the evaluated behavioural characteristic satisfies the predetermined condition, or a negative indicator or punishment if the evaluated behavioural characteristic does not satisfy the predetermined condition.

First Embodiment

Figure 5:
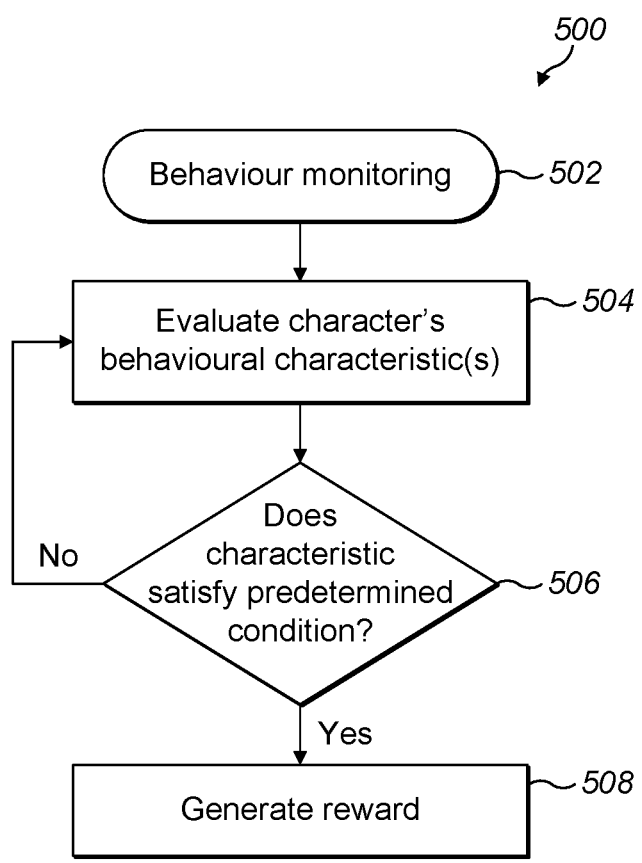
FIG. 5 is a procedural flow diagram of a behaviour monitoring and reward generating routine according to a first embodiment of the invention, in which a reward is generated in response to a behavioural characteristic satisfying a predetermined condition.

FIG. 5 is a procedural flow diagram of a behaviour monitoring and reward generating routine 500 according to a first embodiment, in which a reward is generated and issued to the player character directly in response to a behavioural characteristic satisfying a predetermined condition.

Following the initiation 502 of the routine (e.g. due to the player character commencing combat against an enemy character), the routine causes the character behaviour monitoring unit 105/205 to evaluate 504 one or more player-controlled behavioural characteristic(s) of the player character and to determine 506 whether the or each evaluated behavioural characteristic satisfies a respective predetermined condition, the predetermined condition being respective to the behavioural trait associated with the class of the player character. Examples of such behavioural traits and the respective predetermined conditions are discussed below, with reference to FIG. 8.

In this case, if the evaluated behavioural characteristic satisfies the respective predetermined condition ("Yes" in determination 506), a reward is directly generated 508 by the award generating unit 113/213. Examples of such rewards are discussed below, with reference to FIG. 11.

However, if the evaluated behavioural characteristic does not satisfy the respective predetermined condition ("No" in determination 506), a reward is not generated and the routine continues to evaluate 504 the player character's behavioural characteristic(s) as shown in the flow diagram.

Second Embodiment

Figure 6:
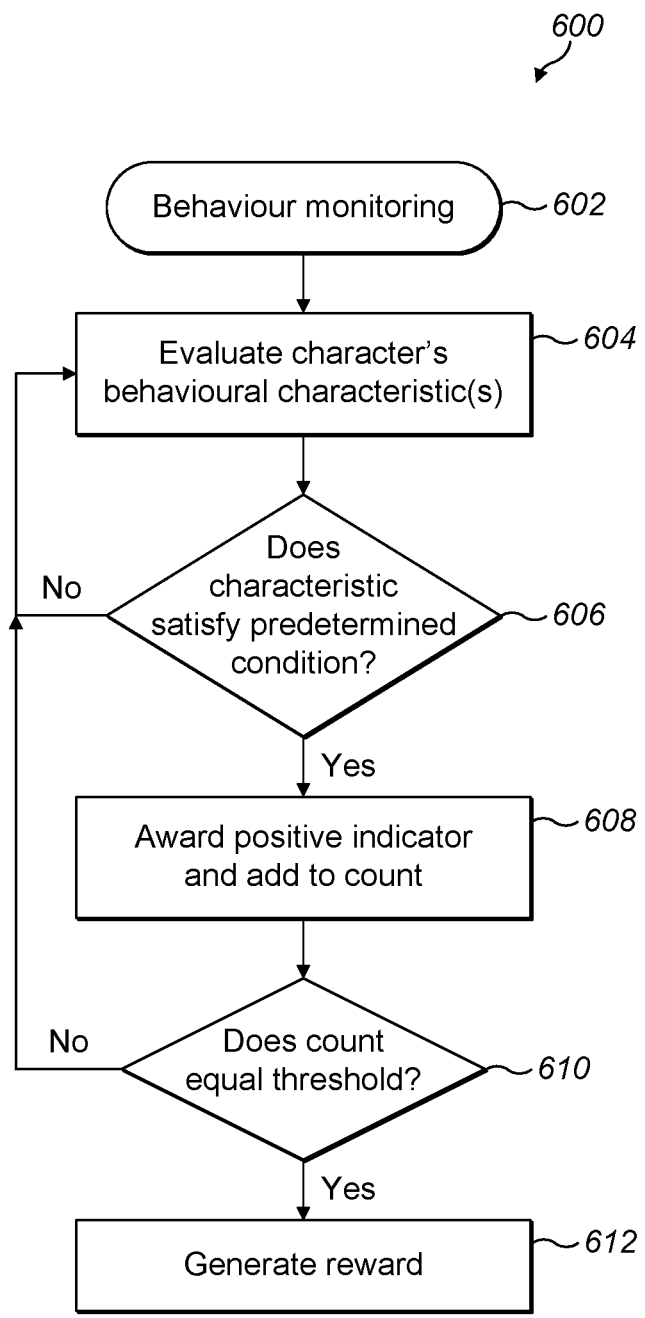
FIG. 6 is a procedural flow diagram of a behaviour monitoring and reward generating routine according to a second embodiment of the invention, in which a positive indicator is generated in response to a behavioural characteristic satisfying a predetermined condition, and a reward is generated when the indicator count reaches a predetermined threshold.

FIG. 6 is a procedural flow diagram of a behaviour monitoring and reward generating routine 600 according to a second embodiment, in which a positive indicator is generated in response to a behavioural characteristic satisfying a predetermined condition, and a reward is generated when the indicator count reaches a predetermined threshold.

Following the initiation 602 of the routine (e.g. due to the player character commencing combat against an enemy character), the routine causes the character behaviour monitoring unit 105/205 to evaluate 604 one or more player-controlled behavioural characteristic(s) of the player character and to determine 606 whether the or each evaluated behavioural characteristic satisfies a respective predetermined condition, the predetermined condition being respective to the behavioural trait associated with the class of the player character. Examples of such behavioural traits and the respective predetermined conditions are discussed below, with reference to FIG. 8.

In this case, if the evaluated behavioural characteristic satisfies the respective predetermined condition ("Yes" in determination 606), a positive indicator is generated 608 by the award generating unit 113/213 and is added to a count. The indicator count is maintained by the award generating unit 113/213 and may be stored in an indicator count table in the memory 106/206 or data storage means 115/215 of the video game apparatus 14 or server 22. Examples of such an indicator count table are discussed below, with reference to FIG. 10.

However, if the evaluated behavioural characteristic does not satisfy the respective predetermined condition ("No" in determination 606), a positive indicator is not generated and the routine continues to evaluate 604 the player character's behavioural characteristic(s).

The award generating unit 113/213 also determines 610 whether the indicator count, when the value thereof has changed, is equal to a threshold value. If the indicator count is equal to the threshold value ("Yes" in determination 610), a reward is then generated 612 by the award generating unit 113/213. Examples of such rewards are discussed below, with reference to FIG. 11. The applicable threshold value may be obtained from a threshold lookup table (as discussed below, with reference to FIG. 9).

However, if the indicator count is not equal to the threshold value ("No" in determination 610), the routine continues to evaluate 604 the player character's behavioural characteristic(s) as shown in the flow diagram.

Third Embodiment

Figure 7:
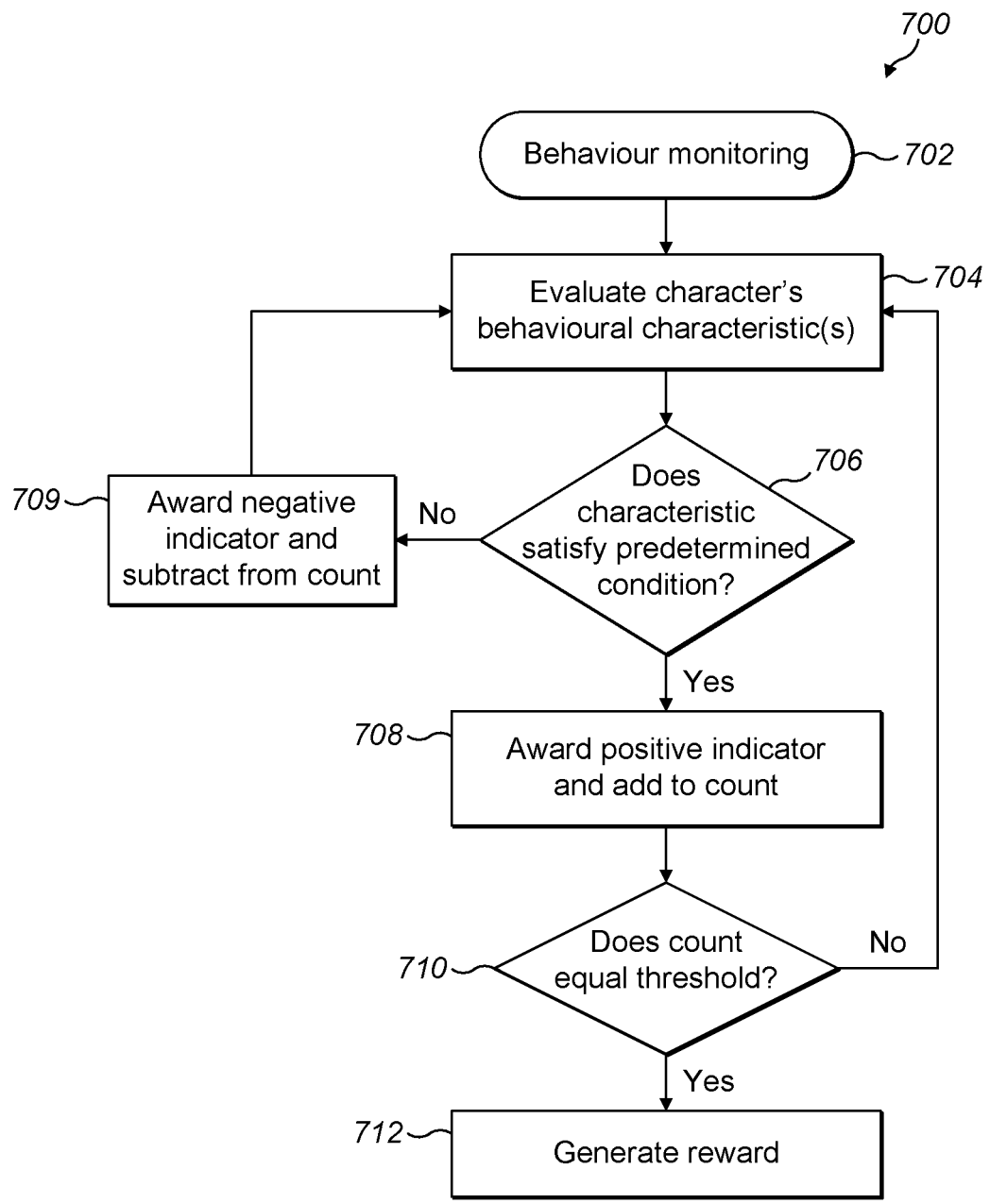
FIG. 7 is a procedural flow diagram of a behaviour monitoring and reward generating routine according to a third embodiment of the invention, in which a positive indicator is generated in response to a behavioural characteristic satisfying a predetermined condition, a negative indicator is generated in response to a behavioural characteristic not satisfying a predetermined condition, and a reward is generated when the overall indicator count reaches a predetermined positive threshold.

FIG. 7 is a procedural flow diagram of a behaviour monitoring and reward generating routine 700 according to a third embodiment, in which a positive indicator is generated in response to a behavioural characteristic satisfying a predetermined condition, a negative indicator is generated in response to a behavioural characteristic not satisfying a predetermined condition, and a reward is generated when the overall indicator count (i.e. the sum of the positive indicators and any negative indicators) reaches a predetermined positive threshold.

Following the initiation 702 of the routine (e.g. due to the player character commencing combat against an enemy character), the routine causes the character behaviour monitoring unit 105/205 to evaluate 704 one or more player-controlled behavioural characteristic(s) of the player character and to determine 706 whether the or each evaluated behavioural characteristic satisfies a respective predetermined condition, the predetermined condition being respective to the behavioural trait associated with the class of the player character. Examples of such behavioural traits and the respective predetermined conditions are discussed below, with reference to FIG. 8.

In this case, if the evaluated behavioural characteristic satisfies the respective predetermined condition ("Yes" in determination 706), a positive indicator is generated 708 by the award generating unit 113/213 and is added to a count. The indicator count is maintained by the award generating unit 113/213 and may be stored in an indicator count table in the memory 106/206 or data storage means 115/215 of the video game apparatus 14 or server 22. Examples of such an indicator count table are discussed below, with reference to FIG. 10.

However, in this case, if the evaluated behavioural characteristic does not satisfy the respective predetermined condition ("No" in determination 706), a negative indicator is generated by the award generating unit 113/213 and is added to the count (i.e. to take the count negative if starting from zero, or to at least partially offset any positive indicator that has already been added to the count) and the routine continues to evaluate 704 the player character's behavioural characteristic(s).

The award generating unit 113/213 also determines 710 whether the indicator count, when the value thereof has changed, is equal to a positive threshold value. If the indicator count is equal to the positive threshold value ("Yes" in determination 710), a reward is then generated 712 by the award generating unit 113/213. Examples of such rewards are discussed below, with reference to FIG. 11. The applicable positive threshold value may be obtained from a threshold lookup table, for example as shown in FIG. 9, which is discussed in greater detail below.

However, if the indicator count is not equal to the threshold value ("No" in determination 710), the routine continues to evaluate 704 the player character's behavioural characteristic(s) as shown in the flow diagram.

In a variant of this embodiment, if in determination 710 it is determined that the indicator count is equal to a negative threshold value, the award generating unit 113/213 may generate a punishment for the player character. Examples of such punishments are discussed below, with reference to FIG. 11. The applicable positive threshold value may be obtained from a threshold lookup table, for example as shown in FIG. 9, which is discussed in greater detail below.

In another embodiment, the award generating unit 113/213 may be configured to only generate negative indicators when the evaluated behavioural characteristic does not satisfy the respective predetermined condition, but does not generate any positive indicators when the evaluated behavioural characteristic does satisfy the respective predetermined condition. Accordingly, this can result in the player character receiving a punishment when the indicator count reaches a negative threshold value, but no "positive" reward is attainable in this case. This embodiment is not presently preferred, as it merely punishes behaviour that is not befitting of the character class, rather than positively rewarding behaviour that is befitting of the character class.

In a yet further embodiment, that is also not presently preferred, the award generating unit 113/213 may be configured to generate an immediate punishment when the evaluated behavioural characteristic does not satisfy the respective predetermined condition. This may be in addition to the possible generation of a direct reward if the evaluated behavioural characteristic does satisfy the respective predetermined condition (as per the first embodiment described above). Alternatively, in this further embodiment, only punishments may be awarded.

In the above embodiments that use positive and/or negative indicators that are added to a total count (e.g. the second and third embodiments described above), the magnitude of the positive and/or negative indicators need not be the same. Rather, the positive and negative indicators may be adjusted, essentially by applying one or more scaling factors, such that a positive indicator increases the value of the indicator count by a first value, whereas a negative indicator decreases the value of the indicator count by a second value (the second value being different from the first). Such first and second values may be obtained from a lookup table, for example as shown in FIG. 12, which is discussed in greater detail below.

When a positive indicator or reward is awarded, or when a negative indicator or punishment is awarded, the user may be notified on-screen, so that they are made aware that their control of the player character is (or is not) commensurate with desirable behavioural traits of their character class. From this, the user may learn that certain behavioural characteristics for that character class are desirable, whilst others are not.

Moreover, by way of guidance, a textual caption may be displayed on the screen, to indicate to the user the behavioural trait(s) associated with the relevant character class. From such guidance, the user may be expected to control their player character in a manner that is befitting to their character class.

Monitored Behavioural Characteristic(s)

As mentioned above, the monitoring of a player character's behavioural characteristics may include the gathering and storing of information relating to the behaviour of the player character when it commences combat (i.e. the monitoring is triggered by the engagement of the player character in combat with an enemy character), or over an extended period of time during a gameplay session. Such data may be stored in the data storage means 115/215. The time over which the character's behaviour is monitored may be the entire length of the combat event, or the entire length of the gameplay session, or discrete parts of the gameplay session.

When monitoring the player character's behavioural characteristics, one parameter that may be monitored is the distance between the player character and the enemy character—for instance at the moment when combat between the player character and the enemy character is commenced.

Another parameter that may be monitored is the weapon which is possessed by the player character, as selected by the player, e.g. when commencing combat, or over an extended period of time. Where monitoring is carried out throughout a gameplay session, a parameter may be a measure of the proportion of time in the game session in which the character possesses a particular weapon. Alternatively, a parameter may be a measure of the number of times the player character possesses a particular weapon during the course of the gameplay session.

Alternatively, another parameter relating to weapon use that may be monitored may be the number of attacks of one or more enemy characters by the player character when using a particular weapon, or a ratio or percentage of the amount of time the player character spends using a particular weapon as a proportion of the overall time spent in combat with one or more enemy characters.

The behavioural traits associated with a particular character class, positive and/or negative indicators, threshold values for the issuance of rewards or punishments, the types of rewards or punishments that may be issued, and any scaling factors that may be applied to the positive and/or negative indicators (i.e. the so-called first and second values discussed above), may be stored in data storage means (e.g. 115/215 of FIG. 3 or 4) for subsequent retrieval. When operating a personal computer or video game console as in the scenario depicted in FIG. 1, the data storage means may comprise, for example, a hard disk or memory within or local to the control unit 14 of the user's video game apparatus 10, although it may alternatively comprise a remote network-based storage device in communication with the video game apparatus 10 via a network. On the other hand, when operating a network-based video game system as in FIG. 2, the data storage means may comprise a remote network-based storage device (e.g. in the server 22 or connected thereto), in communication with the user's terminal device 26 via network 24, or a local storage device within or local to the user's terminal device 26.

Illustrative Tables

Referring to FIGS. 8 to 12, the character behaviour monitoring unit 105/205 and award generating unit 113/213 may retrieve stored data from various tables, for use in the determination of the appropriate reward or punishment to be issued to the player character. These tables will now be discussed in detail:

Behavioural Trait Lookup Table

FIG. 8 shows a behavioural trait lookup table, which contains a list of character classes and associated behavioural traits that are befitting to the respective character classes (i.e. to be promoted within the game). In each case it also contains information on the respective predetermined condition that must be satisfied by a player character during the game for the behavioural trait to be detected as being carried out.

By way of example, the table in FIG. 8 depicts five exemplary character classes with eight associated behavioural traits and nine corresponding predetermined conditions. The exemplary character classes are sniper (denoted in the table by CC1), up-close fighter (CC2), wizard (CC3), pyromancer (CC4), and devastator (CC5).

Referring first to character class CC1 (sniper) in the table of FIG. 8, this character class has two associated behavioural traits, denoted by BT1 and BT2. The behavioural trait BT1 is the engagement in combat with an enemy character at a relatively long distance. As shown under the "predetermined condition" column for this behavioural trait, the predetermined condition that must be satisfied for the character behaviour monitoring unit 105/205 to determine that this behavioural trait is being carried out is that the distance (d) between the sniper player character and the enemy character during combat is greater than a threshold distance (denoted as dcc1 in FIG. 8).

The second behavioural trait associated with CC1 is BT2, which is the use of a sniper rifle as a weapon. The predetermined condition that must be satisfied for the character behaviour monitoring unit 105/205 to determine that this behavioural trait is being carried out is that the weapon used by the player character is a sniper rifle, as shown in the "predetermined condition" column for BT2 in FIG. 8.

The second character class listed in the table in FIG. 8 is CC2 (up-close fighter). This character class also has two behavioural traits, denoted by BT3 and BT4. The behavioural trait BT3 is the engagement in combat with an enemy character at a relatively short distance, and is determined to be carried out if the distance (d) between the player character and the enemy character during combat is less than a threshold distance (denoted as dcc2 in FIG. 8).

The second behavioural trait associated with CC2 is BT4, which is the use of a melee weapon. The predetermined condition that must be satisfied for the character behaviour monitoring unit 105/205 to determine that this behavioural trait is being carried out is that the weapon used by the player character is a melee weapon.

In the examples given in the table in FIG. 8, the third character class, CC3 (wizard), has only one associated behavioural trait, BT5, and a corresponding predetermined condition. This behavioural trait BT5 is the use of magic as a weapon. The predetermined condition that must be satisfied for the character behaviour monitoring unit 105/205 to determine that this behavioural trait is being carried out is the use of magic by the player character as a weapon.

The fourth exemplary character class, CC4 (pyromancer), has two associated behavioural traits, BT6 and BT7. BT6 is the use of fire magic and the predetermined condition of this behavioural trait is the use of fire magic by the player character as a weapon.

BT7 is the engagement of combat between the player character and an enemy character over a relatively long distance. The predetermined condition that must be satisfied for the character behaviour monitoring unit 105/205 to determine that this behavioural trait is being carried out is that the distance (d) between the pyromancer player character and the enemy character during combat is greater than a threshold distance (denoted as dcc4 in FIG. 8).

The final exemplary character class listed in FIG. 8 is CC5 (devastator). This character class has one associated behavioural trait, BT8, namely the infliction of death and destruction in the game world. However, this behavioural trait has two corresponding predetermined conditions, either of which, if satisfied, causes the character behaviour monitoring unit 105/205 to determine that this behavioural trait is being carried out. The first predetermined condition is that the number of deaths of enemy characters, killed by the devastator player character, denoted in the table by $n_{death}$, exceeds a threshold number ($n_{deathCC5}$). The second predetermined condition is that the number of in-game objects destroyed by the devastator player character, denoted in the table by $n_{destruction}$, exceeds a threshold number ($n_{destructionCC5}$).

Threshold Lookup Table

FIG. 9 shows an example of a threshold lookup table containing positive and negative threshold values. As discussed in relation to the second and third embodiments above, a reward may be issued by the award generating unit 113/213 if the sum total of positive (and any negative) indicators reaches the positive threshold value. On the other hand, as discussed in relation to the third embodiment above, a punishment may be issued by the award generating unit 113/213 if the sum total of negative (and any positive) indicators reaches the negative threshold value.

Notably, the lookup table shown in FIG. 9 shows that the positive and negative thresholds can vary in magnitude depending on the character class and other factors, such as the experience points earned by the character, or the number of hours the game has been played. Experience points may be earned by the character as a result of successful playing of the game. The overall trend in the different threshold values shown in FIG. 9 is that, as a player spends longer playing the game, or the player character acquires more experience points, the positive threshold values increase in magnitude, whereas the negative threshold values decrease in magnitude.

Accordingly, an inexperienced player should be able to obtain a reward relatively easily for controlling their player character in a manner befitting of the character type (as a consequence of the positive threshold value being initially relatively low), thereby incentivising the player to continue playing in that desirable manner. However, a more experienced player would be required to reach a higher positive threshold value before receiving a reward, as they would be expected to be more capable of controlling their player character in a manner befitting of the character type.

Conversely, by virtue of the negative threshold values being initially relatively high in magnitude, an inexperienced player ought not to receive a punishment too early in the game, which would potentially be demoralising for the player. On the other hand, a more experienced player would be expected to be more capable of controlling their character in a manner befitting of the character type, hence the lower magnitude of the negative threshold at which a punishment would be given to them.

The positive and negative thresholds may also be specific to the user or player character.

Naturally the threshold lookup table shown in FIG. 9 is merely an example, for an embodiment such as the above-described third embodiment in which both positive and negative threshold values are used. In other embodiments the threshold values may be fixed, i.e. do not vary depending on the character class, the user or player character, the experience points, or the number of hours the game has been played.

It will also be appreciated that, for embodiments such as the above-described second embodiment which only use a positive threshold value, such a lookup table would not include any negative threshold values.

Behaviour Monitoring (Indicator Count) Table

FIG. 10 shows an example of a behaviour monitoring (indicator count) table, logging (in the left hand column) the sum total of positive (and any negative) indicators awarded by the award generating unit 113/213 thus far during the gameplay. In this example, the table also includes the applicable positive and negative threshold values—in this example, taken from the lookup table in FIG. 9, for the case of a sniper class player character (CC1) having 20 experience points or two playing hours. Naturally, for embodiments that only use a positive threshold value, such a table would not include a negative threshold value.

In accordance with presently-preferred embodiments, once a reward (or punishment) is issued, the indicator count in the table is reset to zero.

Reward/Punishment Lookup Table

FIG. 11 shows an example of a reward/punishment lookup table and provides a stored reference for the award generating unit 113/213 to determine which reward or punishment is to be issued to the player character, e.g. when the total indicator count reaches a positive or negative threshold value. In the example shown in FIG. 11, it can be seen that the rewards and punishments vary according to character class. For instance, the reward for CC1 (sniper character class) is the issuance of more experience points, whilst the punishment for CC1 is the character not receiving healing. On the other hand, the reward for CC2 (up-close fighter character class) is an increase in the character's health, whilst again the punishment for CC2 is the character not receiving healing. It will be appreciated that such rewards are intended to be appropriate for the character classes in question. A sniper character (by the nature of their role in the game) is less likely to have received damage to their health during the gameplay, and therefore a reward of experience points may be considered to be a more desirable reward than an increase in health. On the other hand, an up-close fighter character is more likely to have received damage to their health during the gameplay, and therefore an increase in health may be considered to be a more desirable reward than a reward of experience points.

As a punishment, the character not receiving healing may be in respect of healing the character would otherwise receive over time through the normal course of the game. Alternatively, the character not receiving healing may be in respect of healing that would otherwise be received from other players or from interactable elements of the game such as medical packs or food.

It will be appreciated that the rewards described herein are primarily rewards that are issued to the player character. However, in alternative embodiments, the rewards may be of a form that may be issued to the user (i.e. the operator of the player character) themself—e.g. a reward having financial value, or a credit that may be used towards an online transaction such as a game download, etc.

First and Second Value Lookup Table

As discussed above, in certain embodiments a positive indicator may increase the value of an indicator count by a first value, whereas a negative indicator may decrease the value of the indicator count by a second value. Such first and second values may be obtained by the award generating unit 113/213 from a lookup table such as the one illustrated in FIG. 12. This shows that, not only are the first and second values different from one another, but that they may also vary according to the character class. The first and second values may also be specific to the user or player character.

Exemplary Character Types and Behavioural Traits

To illustrate how embodiments of the invention may be implemented within a game, FIGS. 13 to 17 depict a series of screen shots illustrating examples of player character behaviour for different character classes. In practice, such video screens may be generated by the image generator 111/211, virtual camera control unit 112/212, and character generating unit 114/214, under the control of processor 104/204 (see FIGS. 3 and 4). It will of course be appreciated that, in the present FIGS. 13 to 17, black and white line drawings are used to represent what would typically be displayed to the user as rendered video (preferably photo-realistic video rendering) in the game.

Depending on the configuration of the game, the user may provide input (e.g. via input device 103 of FIG. 3) to select a weapon with which to equip the player character, as well as moving the player character within the game world and causing the weapon to be fired or otherwise used.

In the examples shown in FIGS. 13 to 17, the enemy character 305 is a computer-controlled character, also known as a non-player character. However, alternatively, the enemy character may be another player character, for example a member of an opposing team.

Sniper Class—Befitting Behaviour

Figure 13:
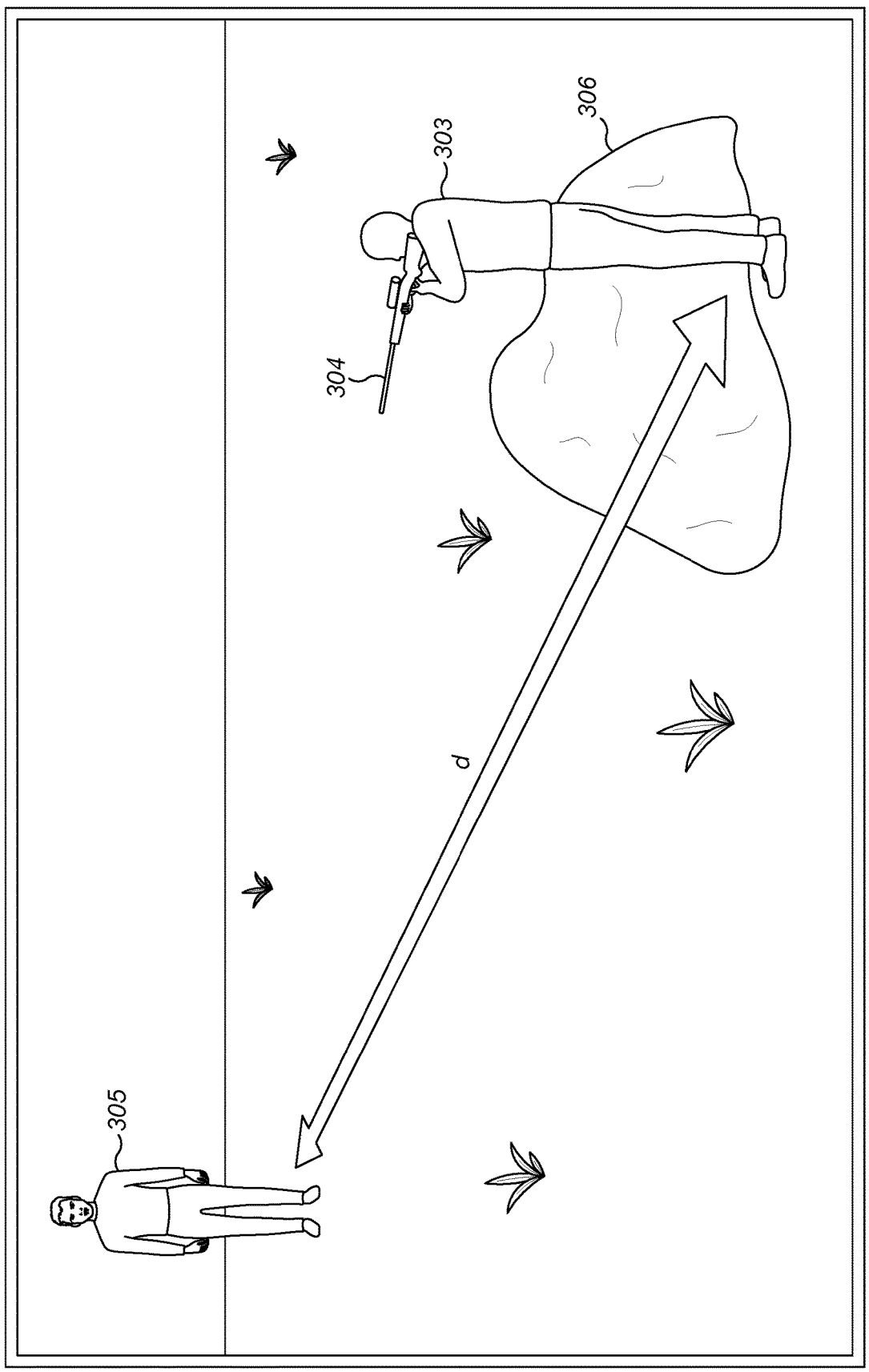
FIG. 13 depicts a screen shot of a sniper character engaging in combat with an enemy character at a relatively long distance, using a sniper rifle, in accordance with desired (i.e. encouraged/promoted) behaviour of a sniper class character.

FIG. 13 shows an example of a player character 303 being of a sniper class. In this example, the player character 303 is being controlled in a manner befitting of that particular character class, for which a positive indicator or reward may be awarded.

More particularly, as shown, the player character 303 is engaging in combat with an enemy character 305. In a manner befitting to the sniper character class, the user has equipped the player character 303 with a sniper rifle 304 as a weapon, and has positioned the player character 303 a relatively long distance d from the enemy character 305 (i.e. greater than the distance dcci given in FIG. 8). Moreover, the user has positioned the player character 303 behind a boulder 306 to provide cover.

Thus, the example depicted in FIG. 13 shows the user carrying out behaviours which are commensurate with desirable behavioural traits of the sniper character class, namely (a) engaging in combat with an enemy character at a relatively long distance from the enemy character, and (b) using a sniper rifle as a weapon—both of which may lead to a positive indicator or reward being awarded. In this example, a further desirable trait, which may also be rewarded, is the use of obstacles in the terrain, such as the boulder 306, as cover (e.g. to shield the player character 303 from return fire from the enemy character 305).

Sniper Class—Unbefitting Behaviour

Figure 14:
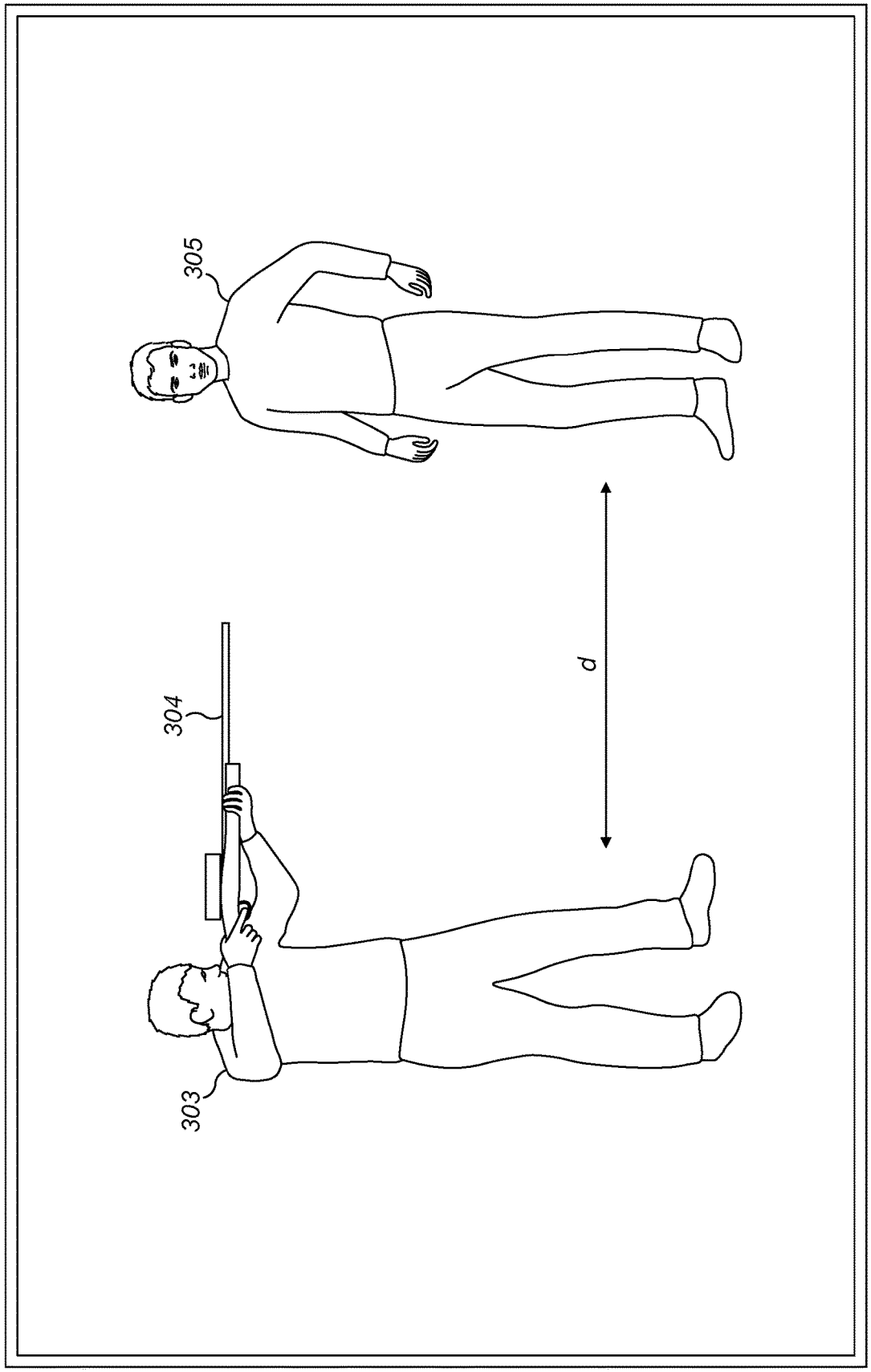
FIG. 14 depicts a screen shot of the character of FIG. 13 engaging in combat with an enemy character at a relatively short distance, contrary to desired behaviour of a sniper class character (i.e. exhibiting behaviour that is discouraged/not promoted)

By way of contrast, FIG. 14 shows the player character 303 of FIG. 13 being controlled in a manner that is not befitting of the sniper character class, as a result of which a negative indicator or punishment may be awarded.

More particularly, as shown, the player character 303 is engaging in combat with the enemy character 305, but the distance d between the player character 303 and the enemy character 305 is relatively short (i.e. less than the distance dcci given in FIG. 8). Moreover, the user has not positioned the player character 303 behind any occluding object to provide cover.

It will therefore be appreciated that, in the example shown in FIG. 14, the user is not carrying out behaviours which are commensurate with desirable behavioural traits of the sniper character class, which may consequently lead to a negative indicator or punishment being awarded.

Close-Combat Fighter Class—Befitting Behaviour

Figure 15:
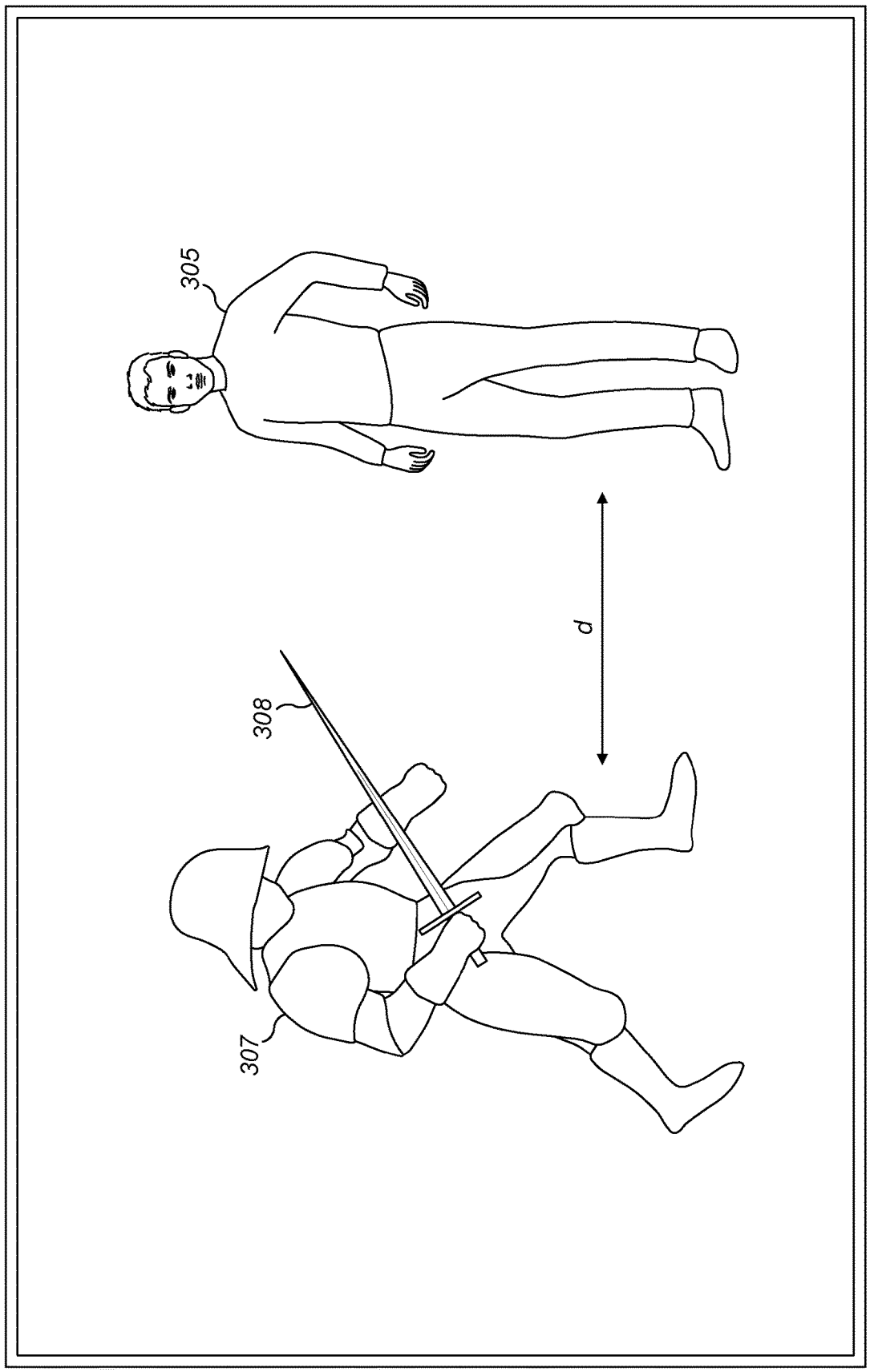
FIG. 15 depicts a screen shot of a close-combat fighter class character engaging in combat with an enemy character at a relatively short distance, using a melee weapon (in this case, a sword), in accordance with desired (i.e. encouraged/promoted) behaviour of a close-combat fighter class character.

FIG. 15 shows an example of a player character 307 being of a close-combat fighter class (also known as an up-close fighter). In this example, the player character 307 is being controlled in a manner befitting of that particular character class, for which a positive indicator or reward may be awarded.

More particularly, as shown, the player character 307 is engaging in combat with an enemy character 305. In a manner befitting to the close-combat fighter character class, the user has equipped the player character 307 with a melee weapon, namely a sword 308, and has positioned the player character 307 a relatively short distance d from the enemy character 305 (i.e. less than the distance dcc2 given in FIG. 8).

Thus, the example depicted in FIG. 15 shows the user carrying out behaviours which are commensurate with desirable behavioural traits of the close-combat fighter character class, namely (a) engaging in combat with an enemy character at a relatively short distance from the enemy character, and (b) using a melee weapon—both of which may lead to a positive indicator or reward being awarded.

Wizard Class—Befitting Behaviour

Figure 16:
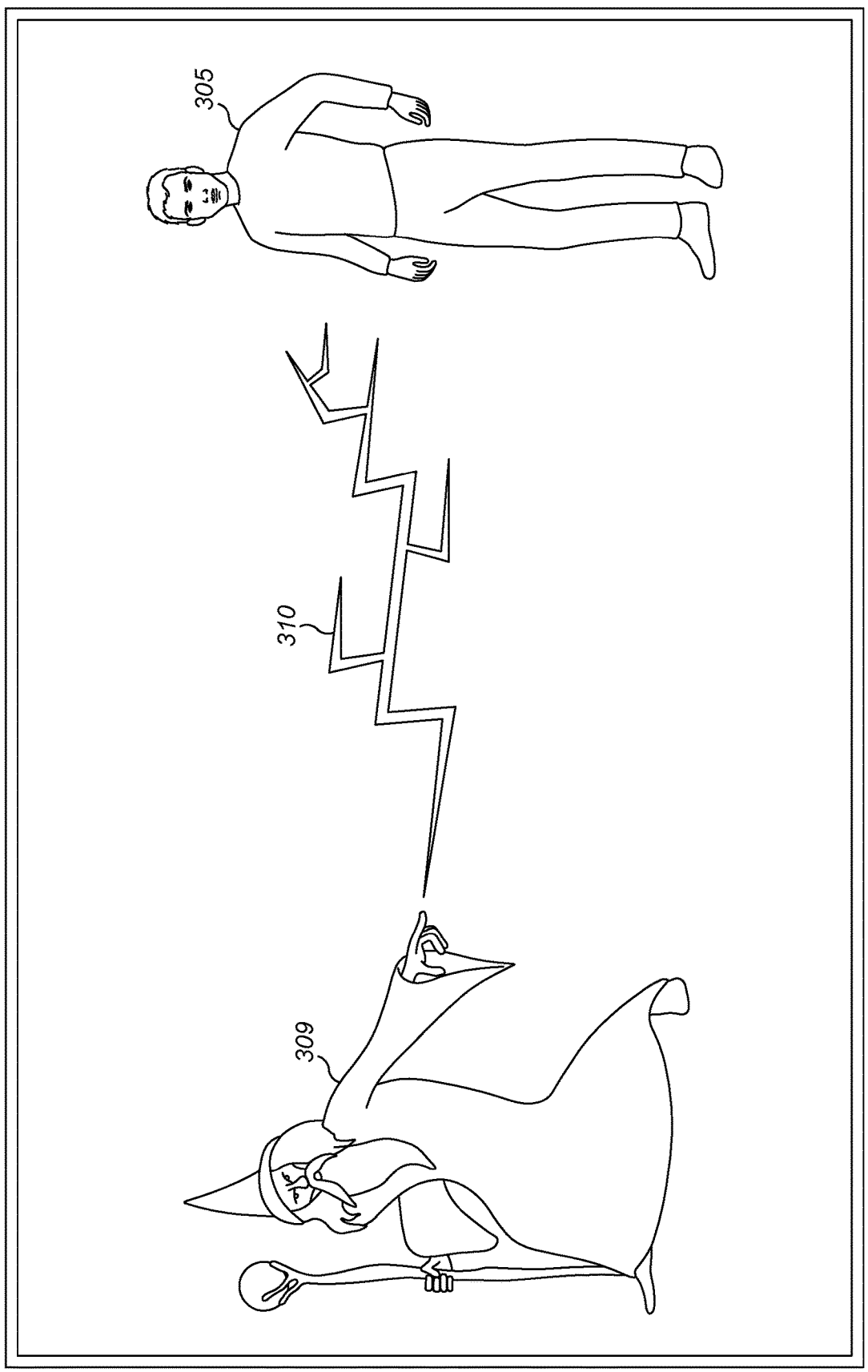
FIG. 16 depicts a screen shot of a wizard class character engaging in combat with an enemy character, using magic as a weapon in accordance with desired (i.e. encouraged/promoted) behaviour of a wizard class character.

FIG. 16 shows an example of a player character 309 being of a wizard class. In this example, the player character 309 is being controlled in a manner befitting of that particular character class, for which a positive indicator or reward may be awarded.

More particularly, as shown, the player character 309 is engaging in combat with an enemy character 305. In a manner befitting to the wizard character class, the user is using magic (in this case, generating lightning 310) as a weapon.

Thus, the example depicted in FIG. 16 shows the user carrying out behaviour which is commensurate with a desirable behavioural trait of the wizard character class, namely the use of magic as a weapon, which may lead to a positive indicator or reward being awarded.

Pyromancer Class—Befitting Behaviour

Figure 17:
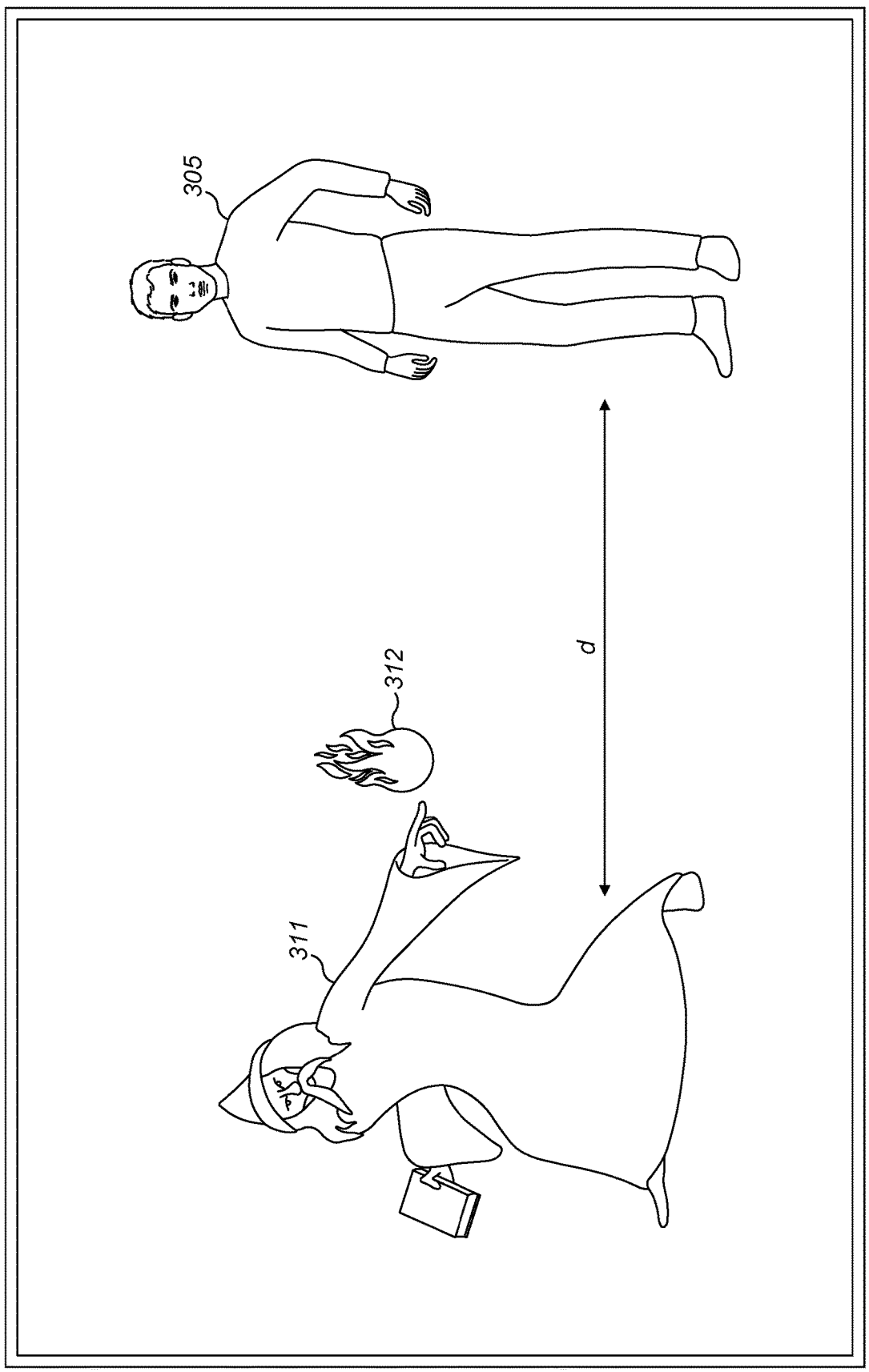
FIG. 17 depicts a screen shot of a pyromancer class character engaging in combat with an enemy character, using fire magic as a weapon in accordance with desired (i.e. encouraged/promoted) behaviour of a pyromancer class character.

Finally, FIG. 17 shows an example of a player character 311 being of a pyromancer class. In this example, the player character 311 is being controlled in a manner befitting of that particular character class, for which a positive indicator or reward may be awarded.

More particularly, as shown, the player character 311 is engaging in combat with an enemy character 305. In a manner befitting to the pyromancer character class, the user is using fire magic (in this case, to generate a fireball 312) as a weapon, and is engaging with the enemy character 305 at a relatively long distance d (i.e. greater than the distance dcc4 given in FIG. 8.

Thus, the example depicted in FIG. 17 shows the user carrying out behaviours which are commensurate with desirable behavioural traits of the pyromancer character class, namely (a) engaging in combat with an enemy character at a relatively long distance from the enemy character, and (b) using fire magic as a weapon—both of which may lead to a positive indicator or reward being awarded.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

The invention claimed is:

1. A non-transitory computer-readable recording medium including a program which is executed by a computer apparatus to provide a video game that is progressed by controlling a character operated by a player in a virtual game world, the program causing the computer apparatus to function as:
   a character generating unit that generates the character operated by the player, wherein the character is of one of a plurality of character classes in the game world, each character class having at least one associated behavioural trait;
   a character behaviour monitoring unit that evaluates a player-controlled behavioural characteristic of the character and determines whether the evaluated behavioural characteristic satisfies a respective predetermined condition, the predetermined condition being respective to the behavioural trait associated with the character class; and
   an award generating unit that generates at least one of:
      a positive indicator if the evaluated behavioural characteristic satisfies the respective predetermined condition; and
      a negative indicator if the evaluated behavioural characteristic does not satisfy the respective predetermined condition,
   wherein the award generating unit is configured to maintain an indicator count,
   wherein the award generating unit is configured to increase a value of the indicator count when a positive indicator is generated, and to issue a reward to the player when the value of the indicator count is equal to a positive threshold value,
   wherein the award generating unit is further configured to decrease the value of the indicator count when a negative indicator is generated, and to issue a punishment to the player when the value of the indicator count is equal to a negative threshold value, and
   wherein once the reward or punishment is issued, the indicator count is reset to zero.

2. The non-transitory computer-readable recording medium according to claim 1, wherein, when a positive indicator is generated, the award generating unit is configured to increase the value of the indicator count by a first value, and when a negative indicator is generated, the award generating unit is configured to decrease the value of the indicator count by a second value.

3. The non-transitory computer-readable recording medium according to claim 2, wherein the first and second values are specific to the character operated by the player.

4. The non-transitory computer-readable recording medium according to claim 2, wherein the first and second values are specific to the character class.

5. The non-transitory computer-readable recording medium according to claim 2, wherein the first value is different from the second value.

6. The non-transitory computer-readable recording medium according to claim 1, wherein the positive threshold value is specific to the character operated by the player.

7. The non-transitory computer-readable recording medium according to claim 1, wherein the positive threshold value is specific to the character class.

8. The non-transitory computer-readable recording medium according to claim 1, wherein the negative threshold value is specific to the character operated by the player.

9. The non-transitory computer-readable recording medium according to claim 8, wherein the program causes the positive threshold value and/or the negative threshold value to change as a function of time the player has been playing the game.

10. The non-transitory computer-readable recording medium according to claim 8, wherein the program causes the positive threshold value and/or the negative threshold value to change as a function of experience points accumulated by the character in the game.

11. The non-transitory computer-readable recording medium according to claim 1, wherein the negative threshold value is specific to the character class.

12. The non-transitory computer-readable recording medium according to claim 1, where the issued reward comprises at least one of: an increase in the character's health, or the issuance of one or more experience points.

13. The non-transitory computer-readable recording medium according to claim 1, wherein the issued punishment comprises the character not receiving healing.

14. The non-transitory computer-readable recording medium according to claim 1, wherein the character behaviour monitoring unit is configured to evaluate the behavioural characteristic of the character when the character commences combat.

15. The non-transitory computer-readable recording medium according to claim 1, wherein the program allows the player to choose their character from one of the plurality of character classes.

16. A non-transitory computer-readable recording medium including a program which is executed by a computer apparatus to provide a video game that is progressed by controlling a character operated by a player in a virtual game world, the program causing the computer apparatus to function as:
   a character generating unit that generates the character operated by the player, wherein the character is of one of a plurality of character classes in the game world, each character class having at least one associated behavioural trait;
   a character behaviour monitoring unit that evaluates a player-controlled behavioural characteristic of the character and determines whether the evaluated behavioural characteristic satisfies a respective predetermined condition, the predetermined condition being respective to the behavioural trait associated with the character class; and
   an award generating unit that generates at least one of:
   a positive indicator if the evaluated behavioural characteristic satisfies the respective predetermined condition; and a negative indicator if the evaluated behavioural characteristic does not satisfy the respective predetermined condition, wherein the award generating unit is configured to maintain an indicator count, wherein the award generating unit is configured to increase a value of the indicator count when the positive indicator is generated, and to issue a reward to the player when the value of the indicator count is equal to a positive threshold value, wherein the award generating unit is configured to decrease the value of the indicator count when the negative indicator is generated, and to issue a punishment to the player when the value of the indicator count is equal to a negative threshold value, wherein the positive threshold value and/or negative threshold value is specific to at least one of the character, the character class, time the player has been playing the game, or experience points accumulated by the character, and wherein once the reward or punishment is issued, the indicator count is reset to zero.

\* \* \* \* \*